United States Patent
Shah (10) Patent No.: US 11,560,289 B2
(45) Date of Patent: Jan. 24, 2023

(54) INSPECTION AND MAINTENANCE SYSTEM FOR ELEVATORS

(71) Applicant: Otis Elevator Company, Farmington, CT (US)

(72) Inventor: Mahesh N. Shah, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1079 days.

(21) Appl. No.: 16/216,483

(22) Filed: Dec. 11, 2018

(65) Prior Publication Data

US 2019/0177123 A1 Jun. 13, 2019

(30) Foreign Application Priority Data

Dec. 12, 2017 (IN) .............................. 201711044637

(51) Int. Cl.
*B66B 5/00* (2006.01)
*B25J 11/00* (2006.01)
*B66B 11/02* (2006.01)

(52) U.S. Cl.
CPC ........... *B66B 5/0025* (2013.01); *B25J 11/005* (2013.01); *B66B 5/0087* (2013.01); *B66B 11/0246* (2013.01)

(58) Field of Classification Search
CPC ................ B66B 5/0018; B66B 5/0025; B66B 5/0087; B66B 11/0246; B25J 11/005; G05B 2219/45066
See application file for complete search history.

(56) References Cited

U.S. PATENT DOCUMENTS

| | | | | |
|---|---|---|---|---|
| 6,050,369 A * | 4/2000 | Leone | ............. | G08B 13/19636 187/280 |
| 7,448,473 B2 * | 11/2008 | Lindberg | ............. | B66B 5/0012 187/392 |
| 8,061,486 B2 * | 11/2011 | Monzon | ................. | B66B 5/005 340/541 |
| 8,418,815 B2 * | 4/2013 | Encinas Carreno | .. | B66B 5/0025 187/390 |
| 9,463,574 B2 * | 10/2016 | Purkayastha | ........ | G05D 1/0088 |
| 10,822,199 B2 * | 11/2020 | Pahlke | ................. | B66B 5/0018 |

(Continued)

FOREIGN PATENT DOCUMENTS

| | | |
|---|---|---|
| CN | 1414921 A | 4/2003 |
| CN | 101580198 A | 11/2009 |

(Continued)

OTHER PUBLICATIONS

Chinese Office Action for Application No. 201811509860.2; dated May 7, 2021; 16 Pages.
European Search Report for Application No. 18211784.6; dated Mar. 31, 2021; 6 Pages.

(Continued)

*Primary Examiner* — Michael A Riegelman
(74) *Attorney, Agent, or Firm* — Cantor Colburn LLP (57) ABSTRACT

An elevator inspection and maintenance system, the system including a mechatronic body movable via remote or automatic operation, an inspection and maintenance head installed on the mechatronic body, where the inspection and maintenance head is fitted with a sensor or a manipulation tool to perform an inspection or a maintenance operation on at least one component of an elevator system remotely or automatically.

24 Claims, 11 Drawing Sheets

(56) References Cited

U.S. PATENT DOCUMENTS

| | | | | |
|---|---|---|---|---|
| 2006/0119572 | A1* | 6/2006 | Lanier | G06F 1/1605 |
| | | | | 345/156 |
| 2011/0240414 | A1* | 10/2011 | Carreno | B66B 5/0025 |
| | | | | 187/390 |
| 2015/0158699 | A1* | 6/2015 | Haapaniemi | B66B 5/0087 |
| | | | | 702/155 |
| 2015/0269792 | A1* | 9/2015 | Wood | G07C 5/006 |
| | | | | 901/44 |
| 2019/0177123 | A1* | 6/2019 | Shah | B25J 11/005 |
| 2019/0352125 | A1* | 11/2019 | Wooten | G05D 1/0282 |
| 2022/0033216 | A1* | 2/2022 | Noguchi | B66B 1/3461 |

FOREIGN PATENT DOCUMENTS

| | | |
|---|---|---|
| CN | 203682801 U | 7/2014 |
| CN | 106276460 A | 1/2017 |
| CN | 106315353 A | 1/2017 |
| EP | 1884453 A2 | 2/2008 |
| EP | 3357852 A1 | 8/2018 |
| EP | 3632831 A1 | 4/2020 |
| JP | 2010189162 A | 9/2010 |
| WO | 2009051587 A1 | 4/2009 |
| WO | 2017207597 A1 | 12/2017 |

OTHER PUBLICATIONS

Chinese Office Action for application CN 201811509860.2, dated Mar. 11, 2020, 11 pages.
CCTV Camera Pros, "Elevator Camera | Elevator CCTV | Wireless Video Transmission", available at: https://www.cctvcamerapros.com/Elevator-Camera-CCTV-p/elt-l1350.htm, accessed Dec. 1, 2017, 9 pages.
Infratech Services, "About Infratech Services—Sewer and Pipe Inspection Services", availabe at: http://infratechservices.ca/about-us/, accesed Nov. 30, 2017, 4 pages.
Kim, Woon-Yong, et al., "The Intelligent Video and Audio Recognition Black-Box System of the Elevator for the Disaster and Crime Prevention", Abstract, International Conference on Advanced Communication and NetworkingACN 2011: Advanced Communication and Networking, 1 page.
Kit, Hui Tsun et al., et al., "Autonomous Elevator Inspection with Unmanned Aerial Vehicle", abstract, Computer Science and Engineering (APWC on CSE), 2016 3rd Asia-Pacific World Congress on Dec. 5-6, 2016; 1 page.
Panasonic Business, "Robotic Arm UR10", available at: http://business.panasonic.co.uk/professional-camera/robotic-camera-systems/arcam-robotic-arm-ur10, accessed Nov. 22, 2017, 3 pages.
European Search Report for application 18211784, dated May 13, 2019, 36 pages.

* cited by examiner

INSPECTION AND MAINTENANCE SYSTEM FOR ELEVATORS

FOREIGN PRIORITY

This application claims priority to Indian Patent Application No. 201711044637, filed Dec. 12, 2017 and all the benefits accruing therefrom under 35 U.S.C. § 119, the contents of which in its entirety are herein incorporated by reference.

TECHNICAL FIELD OF INVENTION

The present invention generally relates to elevators. More particularly, the present invention relates to an inspection and maintenance systems for elevators.

BACKGROUND OF THE INVENTION

Safety of passengers in an elevator system can only be effectively ensured by regular inspection and prompt maintenance operations if any fault arises. However, in a practical world, an elevator inspection and maintenance operation needs to be performed by a human operative and is spaced at least a few days apart. Any fault that may arise during the time between two inspections can cause safety concerns for elevator passengers.

In addition to the practical time constraints of maintenance and inspection of an elevator system, the inspection and maintenance itself takes considerable time as the elevator is closely inspected by a human operator. The operator enters the elevator hoist way on the roof of the elevator and runs it in a special diagnostic mode to check all components of the elevator system present in the hoist way. This may take hours if a fault is identified and correction is needed.

Further, the elevator hoist way is a very hazardous environment for the elevator maintenance operator as it includes many large and heavy moving components and high voltage electrical wiring. Some safety measures have been put in place such as guard rails on the roof of the elevator however, more is needed to improve safety of the maintenance operator in the elevator hoist way.

Some prior art has tried to resolve these problems by providing for remote monitoring/visualization of the elevator hoist way. For example, WO2009051587 A1 describes a method to remotely inspect hoist way condition through a hoist way inspection device that includes an imaging device disposed within the hoist way. However, the said prior art is only limited to visual inspection of the hoist way and is significantly constrained in its capabilities for inspection and diagnostics.

Therefore, there is a continued need in the art for remote and/or automatic systems for elevator inspection and maintenance that can be used much more frequently than a manual inspection and maintenance and that can significantly reduce the need for a human operator to enter the dangerous elevator hoist way environment.

The present invention solves these problems by providing a system for inspection and maintenance of an elevator system that can be operated remotely and/or automatically.

OBJECTIVES OF THE INVENTION

The main objective of this invention is to provide a system for remote elevator inspection and maintenance.

Another objective of this invention is to provide a system for automatic elevator inspection and maintenance.

Yet another objective of the invention is to reduce the need for a human operator to enter an elevator hoist way to perform elevator inspection and maintenance.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Aspects of the present invention relate to an elevator inspection and maintenance system including a mechatronic body movable via remote or automatic operation, and an inspection and maintenance head installed on the mechatronic body. The inspection and maintenance head is fitted with a sensor or a manipulation tool to perform an inspection or a maintenance operation on at least one component of an elevator system, remotely or automatically. In some aspects, the sensor is one of a RGB camera, night vision camera, an infra-red camera, a microphone array, an ultrasound sensor, a laser distance measurement sensor, a laser temperature measurement sensor, an IR depth sensor, a fire sensor, a smoke detector, or a vibration sensor. In some aspects, the elevator inspection and maintenance system is installable on an elevator cab, in a hoist way, or in a machine room of the elevator system. In some aspects, the elevator inspection and maintenance system is installed on a roof, a base, or a side wall outer panel or one of a roof, base, or side wall inner panel of an elevator cab. In some aspects, the elevator inspection and maintenance system includes a track laid on said elevator cab, hoist way, or machine room, and wherein the elevator inspection and maintenance system is movably attached to said track. In some other aspects, the elevator inspection and maintenance system is movably attached to an elevator cab, or to any component in a hoist way, or machine room by a vacuum sub-system. In yet some other aspects, the elevator inspection and maintenance system is movably attached to an elevator cab, or to any component in a hoist way, or machine room using a permanent or electromagnet. In some aspects, the elevator inspection and maintenance system is movably attached to one of outer or inner roof, base, or a side wall panel of an elevator cab. In some aspects, the mechatronic body includes a base, one or more connecting rods and rotatable joints operably connecting the base, and a number of actuators adapted to move the mechatronic body. In some aspects, the base includes a number of wheels for moving the remote elevator inspection and maintenance system. In some other aspects, the base includes a number of mechatronic legs for moving the remote elevator inspection and maintenance system. In some aspects, the inspection and maintenance head is fitted with a sensor hub comprising two or more sensors. In such aspects, the two or more sensors include a RGB camera, night vision camera, an infra-red camera, a microphone array, an ultrasound sensor, a laser distance measurement sensor, a laser temperature measurement sensor, an IR depth sensor, a fire sensor, a smoke detector, or a vibration sensor. In some aspects, the manipulation tool is one of a screw driver, a gripper, wire cutter, adhesive gun, soldering iron, or welding tool. In some aspects, manipulation tool is configured to measure at least one of voltage, current, or impedance of a wire. In some aspects, the manipulation tool is configured to measure vibrations in an elevator component. In some aspects, the elevator inspection and maintenance system can communicate measurements of the sensor to a remote server via the internet. In some aspects, the remote movement, inspection, and monitoring procedures of the elevator inspection and maintenance system is performed by a human operator in a remote control room in communication with the elevator inspection and maintenance system.

Aspects of the present invention also relate to an elevator cab including an elevator cab body; an elevator inspection and maintenance system attached to said elevator cab body; wherein the elevator inspection and maintenance system includes a mechatronic body movable via remote or automatic operation, an inspection and maintenance head installed on the mechatronic body, wherein said inspection and maintenance head is fitted with a sensor or a manipulation tool to perform an inspection or a maintenance operation on at least one component of an elevator system remotely or automatically. In some aspects, the elevator inspection and maintenance system is movably attached to an inner or outer roof, base, or side wall panel of the elevator cab. In some aspects, the elevator inspection and maintenance system is movably attached to the elevator cab body via a track laid on said inner or outer roof, base, or side wall panel of the elevator cab. In some other aspects, the elevator inspection and maintenance system is movably attached to said elevator cab body via a vacuum sub-system. In some other aspects, the elevator inspection and maintenance system is movably attached to said elevator cab body using a permanent or electromagnet. In some aspects, mechatronic body includes a base; one or more connecting rods and rotatable joints operably connecting the base to the inspection and maintenance head; and a number of actuators adapted to move the said connecting rods and rotatable joints. In some aspects, the base includes a number of wheels for moving the inspection and maintenance system over the surface of elevator cab body. In some other aspects, base includes a number of mechatronic legs for moving the inspection and maintenance system over the surface of said panel of the elevator cab. In some aspects, the manipulation tool is one of a screw driver, a gripper, wire cutter, adhesive gun, soldering iron, or welding tool. In some aspects, manipulation tool is configured to measure at least one of voltage, current, or impedance of a wire. In some aspects, manipulation tool is configured to measure vibrations in an elevator component. In some aspects, sensor is one of a RGB camera, night vision camera, an infra-red camera, a microphone array, an ultrasound sensor, a laser distance measurement sensor, a laser temperature measurement sensor, an IR depth sensor, a fire sensor, a smoke detector, or a vibration sensor. In some aspects, inspection and maintenance system can operate automatically on a pre-planned inspection routine. In some aspects, inspection and maintenance system can communicate measurements of the sensors to a remote server via the internet. In some aspects, the remote movement, inspection, and monitoring procedures of the elevator inspection and maintenance system is performed by a human operator in a remote control room in communication with the elevator inspection and maintenance system.

Aspects of the invention further relate to a method for remotely monitoring equipment in an elevator cab hoist way using an inspection and maintenance system, said method including remotely operating the inspection and maintenance system by an operator from a control room; and running inspection tests on equipment accessible to the inspection and maintenance system through said remote operation.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF INVENTION

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

Inspection and maintenance of elevator systems require manual intervention by a human operator, which brings in additional monetary and temporal costs, and subjects the human operator to hazardous conditions in the elevator system. Further, increasing frequency of scheduled manual inspections by human operators has many practical constraints.

To overcome the short comings of the current state of the art, the present invention describes an elevator inspection and maintenance system. The elevator inspection and maintenance system is operably connected to an elevator cab, a hoist way or a machine room. The elevator inspection and maintenance system has two parts a mechatronic body and an inspection and maintenance head. The mechatronic body includes a base and a number of connecting rods and rotatable joints, which are made movable by a number of actuators. The inspection and maintenance head includes a sensor and/or a manipulation tool. The elevator inspection and maintenance system is in communication with a remote control room via a communication unit and can perform remotely controlled or automatic pre-planned elevator inspection and maintenance operations. The elevator inspection and maintenance system in some embodiments can move along a pre-planned track on the surface of an elevator cab, hoist way, or machine room for inspecting various elements in the elevator hoist way.

Figure 1A:
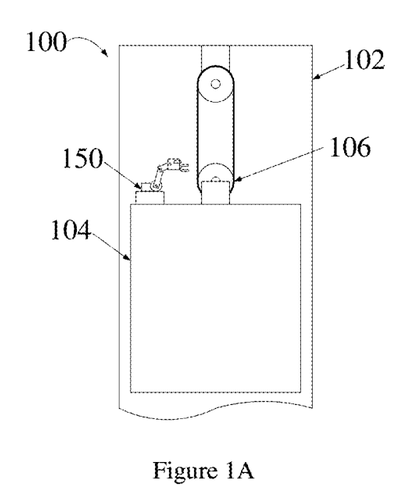
FIGS. 1A-1D schematically illustrates a first embodiment of an elevator inspection and maintenance system.
Figure 1B:
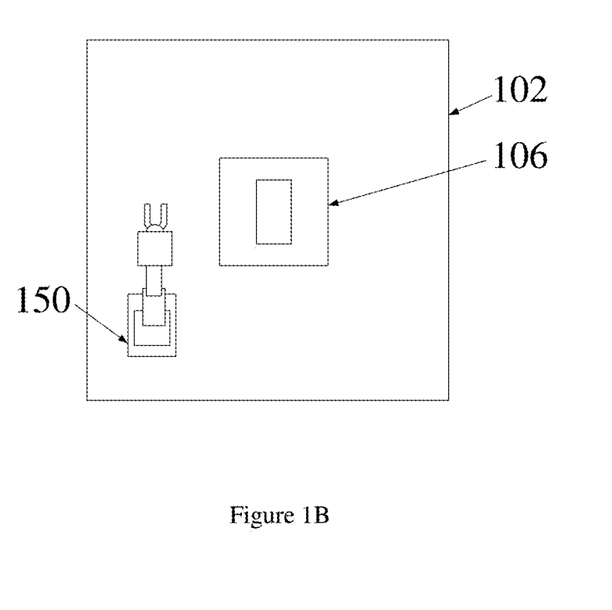
Figure 1C:
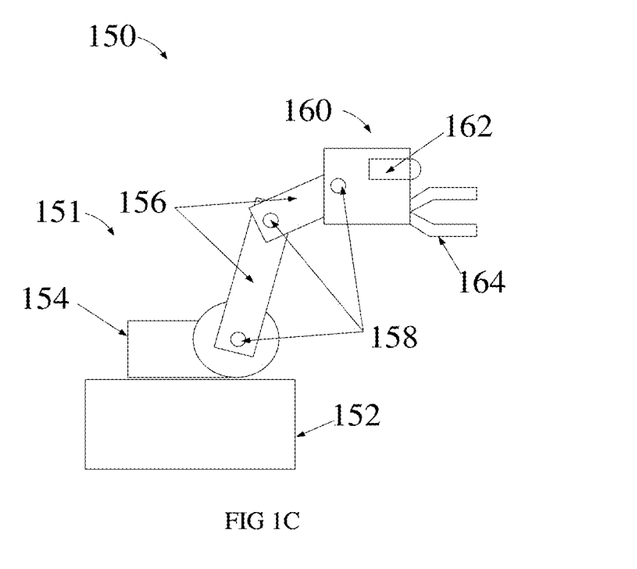
Figure 1D:
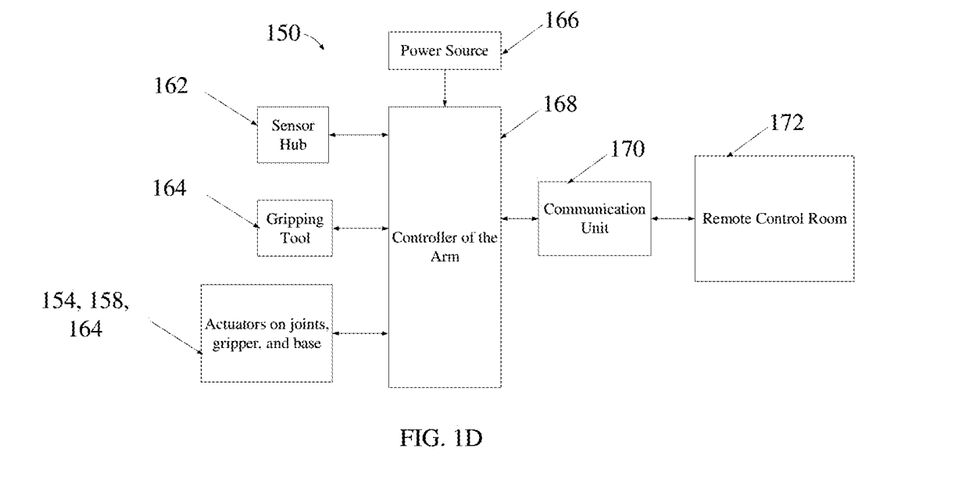

FIGS. 1A-1D schematically illustrates a first embodiment of the elevator inspection and maintenance system. FIG. 1A depicts a schematic side view of an elevator system 100 in an elevator hoist way 102 comprising an elevator cab 104, elevator hoist way equipment 106, and an elevator inspection and maintenance system 150. The term hoist way equipment 106 encompasses all components of the elevator system 100 accessible for inspection and maintenance from within the hoist way 102. FIG. 1B depicts a schematic top view of said elevator cab 104 and the positioning of hoist way equipment 106 and system 150. FIG. 1C depicts a schematic side view of the system 150. The system 150 includes a mechatronic body 151 including a base 152, a rotatable intermediate component 154, a number of links 156, rotatable joints 158, and a number of actuators (not shown) within the rotatable joints 158. The system 150 further includes an inspection and maintenance head 160. The inspection and maintenance head 160 includes a sensor (or a sensor hub 162 having two or more sensors) and a manipulation tool 164. FIG. 1D depicts the operational components of the system 150. The system 150 includes a power source 166 for powering all components of the system 150, a controller 168 for controlling operation of all components of the system 150 and a communication unit 170 for providing communication with a remote control room 172. The communication unit 170 facilitates remote operation of the system 150 by a human operator in the remote control room 172.

In this first embodiment, the base 152 is fixedly attached to the top surface panel of the elevator cab 104 using any known attachment or fastening means such as welds, screws, pins, etc. The attachment position of the base 152 on the top of the elevator cab 104 can be strategically defined to allow the inspection and maintenance head 160 to perform inspection and maintenance operations on hoist way equipment 106.

The intermediate component 154 is rotatably attached to the base 152 with its axis of rotation being perpendicular to the surface of attachment with the base 152 such that the intermediate component 154 can rotate 360° about its axis. An actuator, such as a stepper motor within the base 152 or the intermediate component 154 rotates the intermediate component 154 relative to the base 152.

The links 156 and the rotatable joints 158 are connected to the intermediate component 154 such that rotation of the intermediate component 154 also rotates the links 156 and rotatable joints 158 along with the intermediate component 154. The joints 158 include actuators that can be controlled to provide a number of degrees of freedom to the arrangement of the links 156 and joints 158. The inspection and maintenance head 160 is connected to the last link 156 and the last joint 158 on the opposite end to the base 152, allowing it to be moved relative to the last link 156. The number of links 156 and joints 158 in different embodiments may vary in accordance with the length and complexity of the system 150 required, for example, in an embodiment, as shown, the system 150 may have two links 156 and three joints 158. Further, the shape of the system 150 may not necessarily be the same as shown in the embodiment of FIG. 1C. In other embodiments, the system 150 may have varied shapes based on the requirements of the elevator systems in which the system 150 may be used. For example, in some embodiments, some of the links 156 may be curved, or may have different lengths, to access all necessary hoist way components 106.

The sensor is one of (or sensor hub 162 includes two or more of) a number of known sensors for inspection of the hoist way equipment 106. In an exemplary embodiment, for instance, the sensor hub 162 may include a RGB camera or a night-vision camera for visual inspection of equipment 106. In another exemplary embodiment, the sensor hub 162 includes an infrared camera or a laser temperature sensor to inspect heat generated in the hoist way equipment 106. In some exemplary embodiments, the sensor hub 162 includes a microphone or a microphone array to detect changes in the sounds produced during operation of the elevator system 100. The sounds produced during operation of the elevator system 100 may indicate a fault within the elevator 104. In some embodiments, the sensor hub 162 includes a laser distance measurement sensor that can be used to measure strain in the cables or changes in the distances of equipment 106 from their pre-engineered positions. In some other embodiments, other types of sensors such as an ultrasound sensor or an Infrared (IR) depth sensor can also be included to improve non-contact inspection of the equipment 106. In some embodiments, other known sensors such as fire or smoke detection sensor or vibration sensor, etc., are also included in the sensor hub 162. Any known type of sensor in the art can be incorporated into the sensor hub 162 to monitor or inspect various components of the elevator system 100.

The manipulation tool 164 can be any tool known in the art, configured to manipulate or perform a maintenance operation on any hoist way equipment 106. There may be more than one manipulation tools in inspection and maintenance head 160. Some examples of such manipulation tools include screw driver, a gripper, wire cutter, adhesive gun, soldering iron, welding tool, etc.

In some embodiments, the manipulation tool 164 includes a movable claw that is used by the system 150 for gripping various types of equipment 106 within the hoist way 102 to closely inspect equipment 106 using the sensors in the sensor hub 162. In some embodiments, the manipulation tool 164 is also equipped with circuitry to measure electrical current, voltage, and impedance in any equipment 106 in contact with the manipulation tool 164. In some embodiments, the manipulation tool 164 is further equipped with a vibration measuring sensor to measure vibrations in any equipment 106 in contact with the manipulation tool 164.

The power source 166 includes an electrical line connecting the electrical supply of the elevator cab 104 to a power management electrical circuit within the base 152. In some embodiments, the power management electrical circuit includes a backup battery for operating the inspection and maintenance system 150 to inspect the elevator hoist way 102 when the elevator power is cut.

The controller 168 is a microcontroller known in the art, and can be accommodated in any physical part of the system 150 with sufficient available space, such as the base 152, intermediate component 154, links 156, or inspection and maintenance head 160. The controller 168 is operationally connected to the power source 166, sensor hub 162, manipulation tool 164, and all actuators in the intermediate component 154 and joints 158. The controller 168 is further connected to the communication unit 170 and converts commands received via the communication unit 170 into various actions that can be performed by the system 150 and encodes sensor data to be transmitted to the remote control room 172 via the communication unit 170.

The communication unit 170 is an electronic circuit supporting communication over any kind of wired or wireless network/internet connection. The communication unit 170 operationally connects the controller 168 to the remote control room 172, from where a human operator can operate the system 150.

The remote control room 172 is a room with equipment such as a network connected computer that can be used for controlling the system 150 by a maintenance operator/technician to inspect remotely the elevator hoist way equipment 106 and perform some maintenance tasks using the manipulation tool 164.

In some embodiments, the controller 168 may be programmed to periodically perform automatic inspection routines and send reports to the control room 172 for inspection by a human maintenance operator/technician.

In some other embodiments, the controller 168 may be programmed to continuously run an automatic inspection routine during the operation the elevator system 100 to monitor the functioning of the elevator system 100 in real-time and to continuously send a stream of sensor data to the control room 172.

In some embodiments, the inspection and maintenance system 150 may be connected to an artificial intelligence/machine learning system via the communication unit 170 or alternatively the artificial intelligence/machine learning system can be installed in the inspection and maintenance system 150. The artificial intelligence/machine learning system can automatically detect faults during inspection of the elevator system 100 and alert maintenance operatives/technicians.

In some elevator systems 100, rigidly fixing the system 150 at a position at the top of the elevator cab 104 may not allow for full inspection of the hoist way equipment 106. To improve the ability of the system 150 to reach equipment 106 at distant locations, the inspection and maintenance system 150 may be made movable on the surface of the elevator cab 104 or other parts of the elevator system 100.

The following sections present various embodiments of inspection and maintenance systems similar to the inspection and maintenance system 150 of the first embodiment along with the capability of shifting position of the inspection and maintenance system 150 to various locations, such as outer or inner panels of the elevator cab 104, walls of the hoist way 102, or machine room, within the elevator system 100.

Figure 2A:
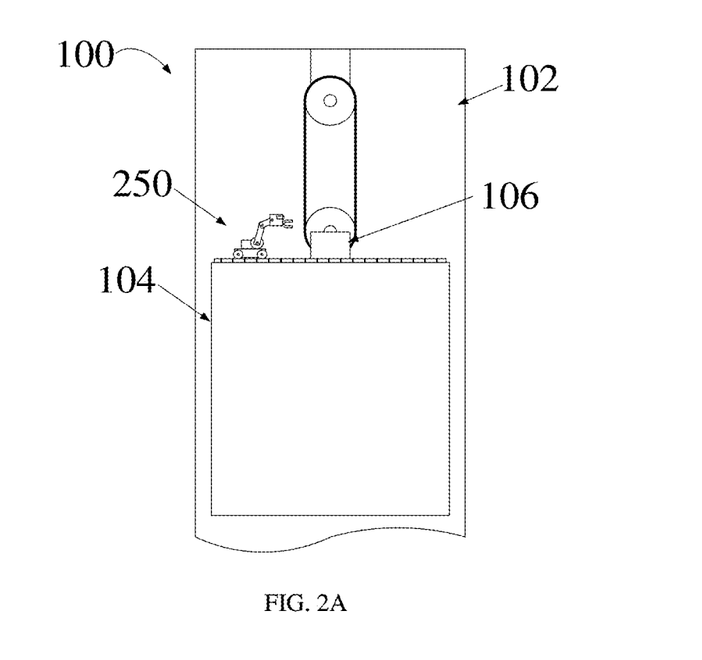
FIGS. 2A-2C schematically illustrates a second embodiment of the elevator inspection and maintenance system.
Figure 2B:
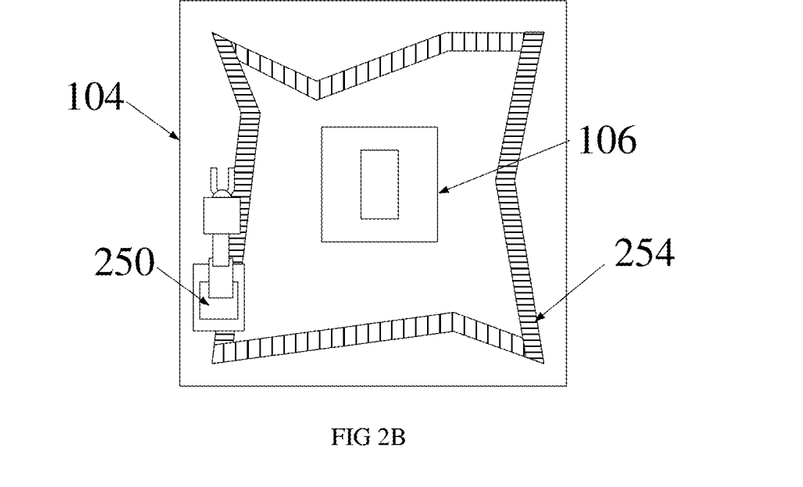
Figure 2C:
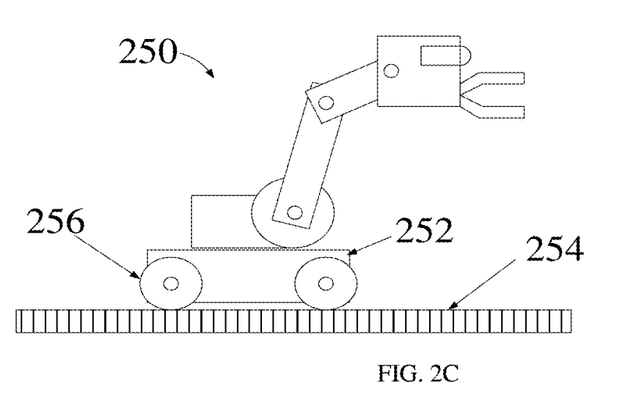

FIGS. 2A-2C schematically illustrates a second embodiment of an inspection and maintenance system 250. FIGS. 2A and 2B depict schematic side view of the elevator system 100 and top view of the elevator cab 104 comprising the inspection and maintenance system 250, respectively. Further, as shown in FIG. 2C, in addition to components mentioned in the first embodiment of the inspection and maintenance system 150, the inspection and maintenance system 250 of the second embodiment includes a track 254 laid on the outer top/roof panel of the elevator cab 104 and a motion mechanism 256 housed within the base 252 of the inspection and maintenance system 250 to move the inspection and maintenance system 250 on the track 254. The track 254 and the motion mechanism 256 can be any type of track systems known in the art. For example, a rail track 254 and actuated wheels 256 can be used for motion of the inspection and maintenance system 250 on the top of the elevator cab 104. The track 254 can be laid in any strategic pattern on the top of elevator cab 104 to ensure maximum ability of the inspection and maintenance system 250 for inspecting hoist way equipment 106. The track 254 can be, for example, of any shape, such as a regular rectangular, square, oval, circular shape, etc., or as an irregular shape, as shown, specifically tailored to access specific hoist way equipment 106.

Figure 3A:
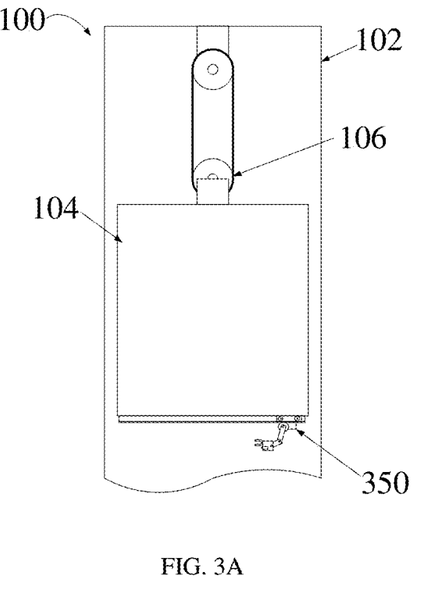
FIGS. 3A-3C schematically illustrates a third embodiment of the elevator inspection and maintenance system.
Figure 3B:
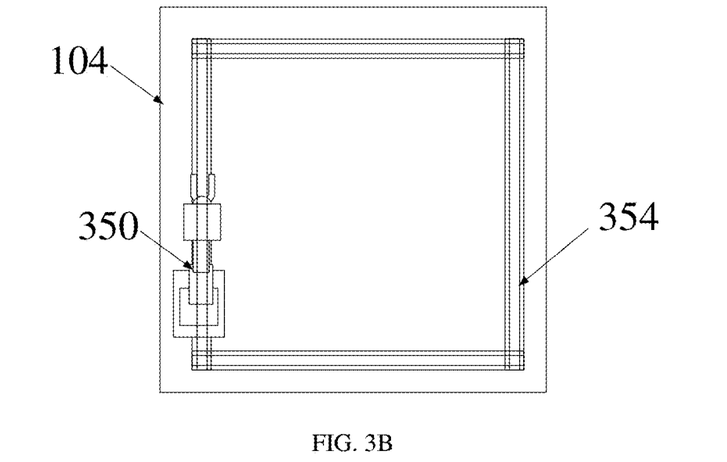
Figure 3C:
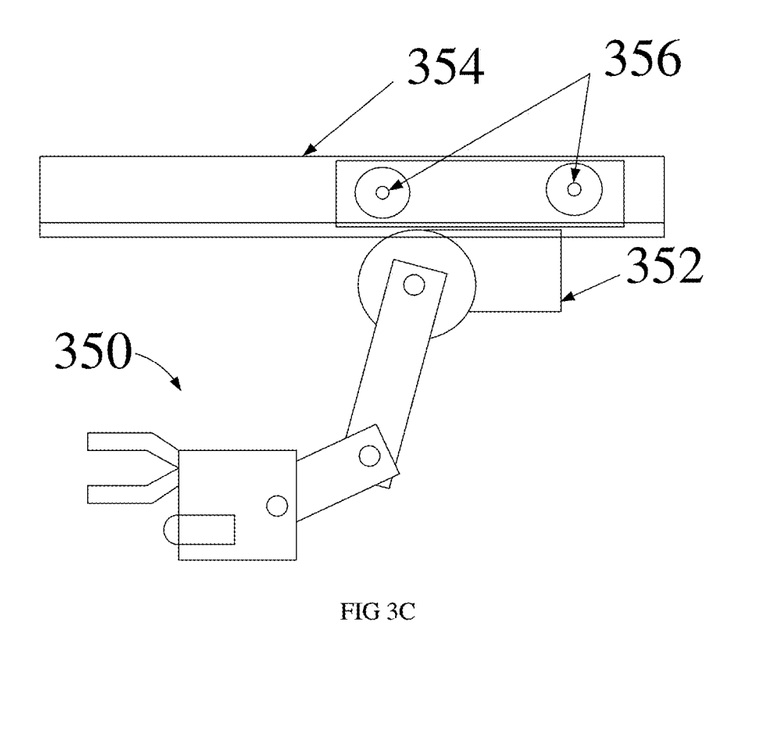

FIGS. 3A-3C schematically illustrates a third embodiment of an elevator inspection and maintenance inspection and maintenance system 350. FIGS. 3A and 3B depict schematic side view of the elevator system 100 and bottom view of the elevator cab 104 comprising the inspection and maintenance system 350, respectively. Further, as shown in FIG. 3C, alternative to components mentioned in the second embodiment of the inspection and maintenance system 250, the inspection and maintenance system 350 of the third embodiment includes a track 354 laid on the outer bottom/base panel of the elevator cab 104 and includes a motion mechanism 356 housed within the base 352 to move the inspection and maintenance system 350 on the track 352. For example, the track 354 can be an inverted rail known in the art, and the motion mechanism may be actuated wheels 356 held between the inverted rails.

Figure 4:
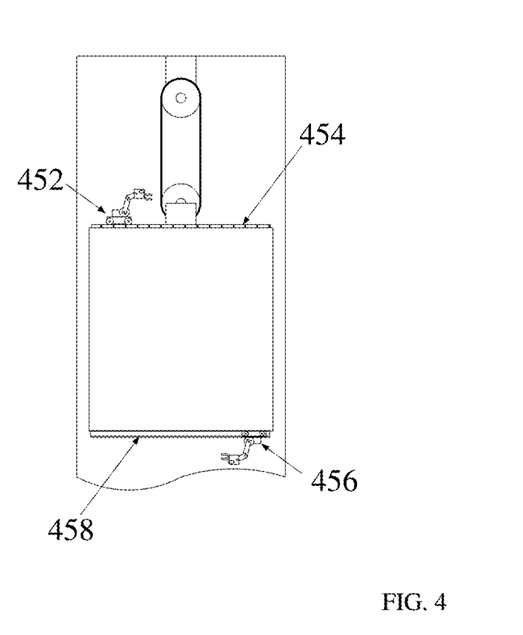
FIG. 4 schematically illustrates a fourth embodiment of the elevator inspection and maintenance system.

FIG. 4 schematically illustrates a fourth embodiment where, there may be two inspection and maintenance systems 452 and 456 attached to the elevator cab 104 on a top track 454 and a bottom track 458 respectively.

Figure 5:
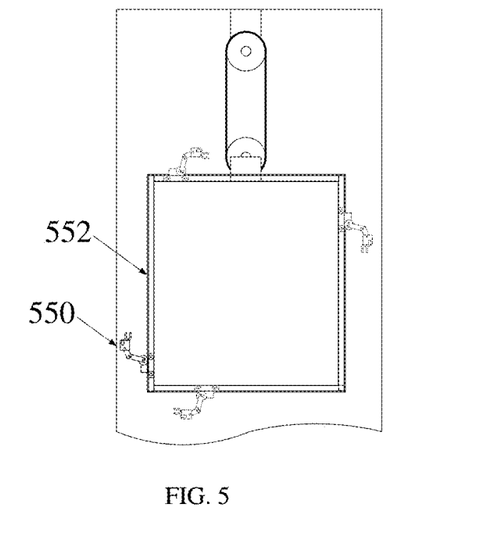
FIG. 5 schematically illustrates a fifth embodiment of the elevator inspection and maintenance system.

FIG. 5 schematically illustrates a fifth embodiment of a elevator inspection and maintenance inspection and maintenance system 550. As shown, in this embodiment, the inspection and maintenance system 550 includes a single track 552 running across on roof, sides, and bottom parts/panels of the elevator cab 104 and the inspection and maintenance system 550 can move over this track 552 across the roof, sides, and bottom parts of the elevator cab 104. In such a system 550, the track 552 can be any screw-type, wired or geared pulling system known in the art.

In such movable systems 250, 350, 452, 456, 550, the power source 166 may receive electrical energy from the elevator cab 104 through the tracks 254, 354, 454, 458, and 552.

Although the tracks 254, 354, 454, 458, and 552 in the embodiments shown above are laid on the elevator cab 104, a person of ordinary skill in the art can easily contemplate the track being laid out on other parts of the elevator system 100, such as the walls of the hoist way 102 or the machine room of the elevator system for motion of an embodiment of the inspection and maintenance system in those parts of the elevator system 100.

In some embodiments, the inspection and maintenance system may be track-less and movable freely on the elevator cab 104 and other parts of the elevator system 100 without the use of any track. In such embodiments, the inspection and maintenance system may be adapted to adhere to the surface of the elevator cab 104 or other components in the hoist way 102.

Figure 6:
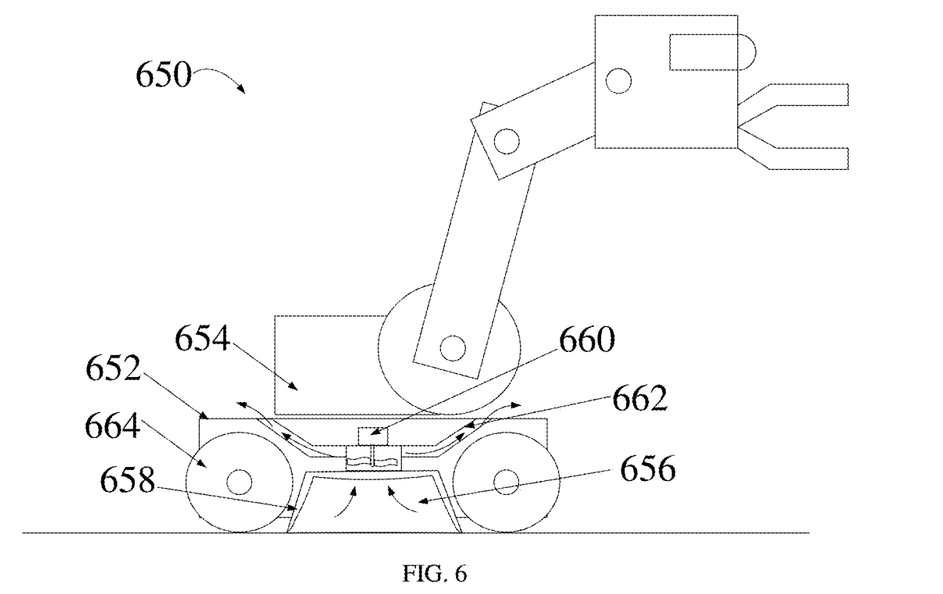
FIG. 6 schematically illustrates a sixth embodiment of the elevator inspection and maintenance system.

FIG. 6 illustrates an embodiment of the inspection and maintenance system 650 that is movable on the walls of the elevator cab 104 and other components in the hoist way 102. The inspection and maintenance system 650 having a base 652, which has a vacuum sub-system 654 to adhere the inspection and maintenance system 650 to the surface of the elevator cab 104. The vacuum sub-system 654 includes a vacuum chamber 656 having a peripheral rubber or polymer guard 658 at the lower side of the base 652 to adhere to the surface of the walls of the elevator cab 104 or other components in the hoist way 102, a vacuum pump 660 for creating a vacuum in the vacuum chamber 656 and exhaust vents 662 for exhaust of air from the vacuum chamber 656. The base 652 also includes wheels 664 for moving the inspection and maintenance system 650 on any wall surface.

The vacuum generated between the vacuum chamber 656 and the surface of the walls of the elevator cab 104 keeps the inspection and maintenance system 650 attached to the walls, roof or base of the elevator cab 104 and the hoist way 102. Although, the embodiment as shown in FIG. 6 illustrates one vacuum chamber 656, other variations of this embodiment may include a plurality of vacuum chambers for adherence of the inspection and maintenance system 650 to the walls, roof or base of the elevator cab 104 and the hoist way 102.

Figure 7:
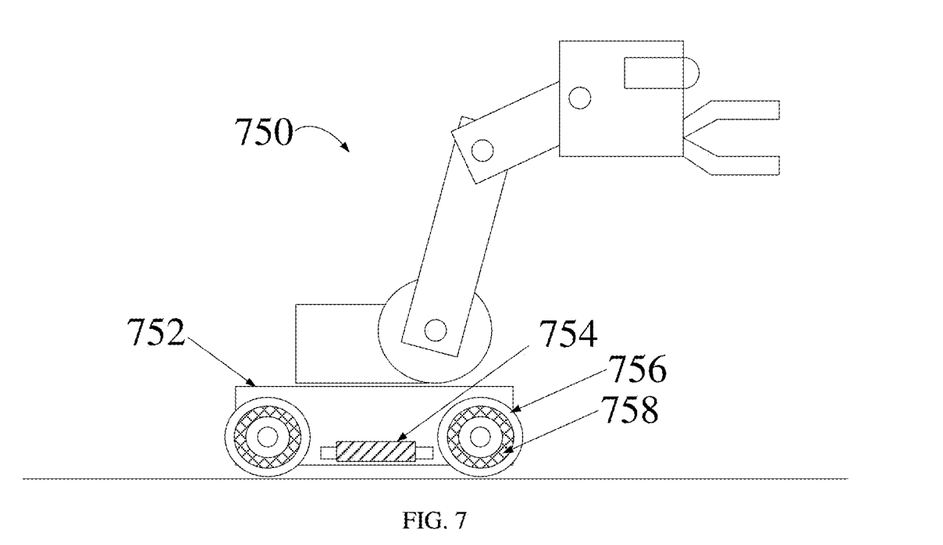
FIG. 7 schematically illustrates a seventh embodiment of the elevator inspection and maintenance system.

FIG. 7 illustrates another embodiment of the inspection and maintenance system 750 that is movable on the walls of the elevator cab 104 and other parts of the elevator system 100. The inspection and maintenance system 750 includes a base 752 with permanent or electromagnets 754 attached to the lower end for adherence to the metallic structures of the elevator cab 104 and the other components in the hoist way 102 or machine room. The inspection and maintenance system 750 may also include wheels 756 with permanent or electromagnets 758 to adhere the system 750 to the walls, roof or base of the elevator cab 104, walls and other components of the hoist way 102, or components in the machine room of the elevator system 100.

A person of ordinary skill in the art that an embodiment combining the features, i.e. vacuum sub-system and permanent or electromagnets described in the embodiments 650 and 750 as shown in FIGS. 6-7 of the inspection and maintenance system can also be formed for track-less operation of the inspection and maintenance system.

Figure 8:
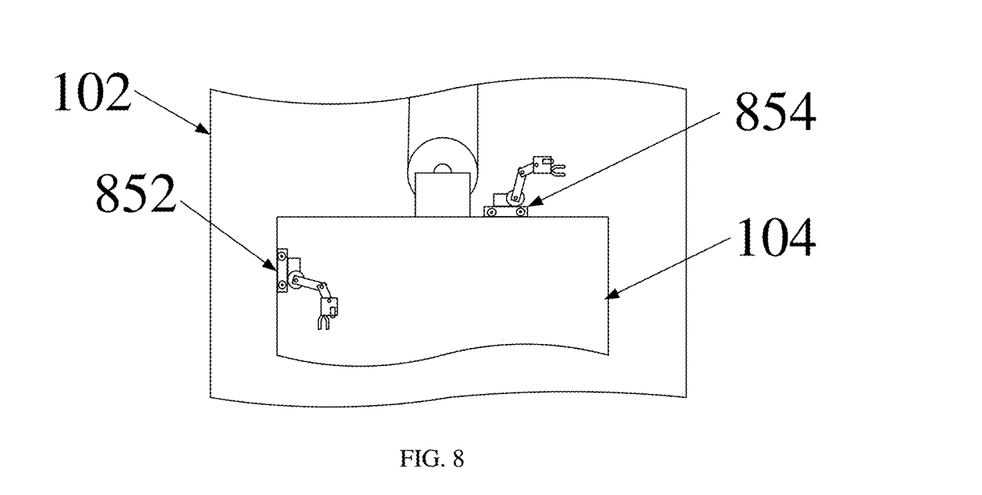
FIGS. 8-11 illustrate various applications of the track-less inspection and maintenance systems 650 or 750 as shown in FIGS. 6-7.

FIGS. 8-11 illustrate various applications of the track-less inspection and maintenance systems 650 or 750 as shown in FIGS. 6-7. As shown in FIG. 8, in some embodiments, two track-less inspection and maintenance systems 852 and 854 may be attached to the elevator cab 104. In these embodiments, one of the inspection and maintenance systems 852 is on the outer surface of the elevator cab 104 and the second inspection and maintenance system 854 is on the inner chamber of the elevator cab 104. The inspection and maintenance system 854 in the inner chamber of the elevator cab 104 can monitor and inspect components within the inner chamber, such as electrical fittings, switches, and cables, lights, car operating panel, fan, etc. The inspection and maintenance system 854 can also act as a maneuverable security camera and emergency assistance system when the elevator cab 104 is operational. For example, in an elevator malfunction, the inspection and maintenance system 854 can check on passengers and help passengers communicate with maintenance staff.

Figure 9:
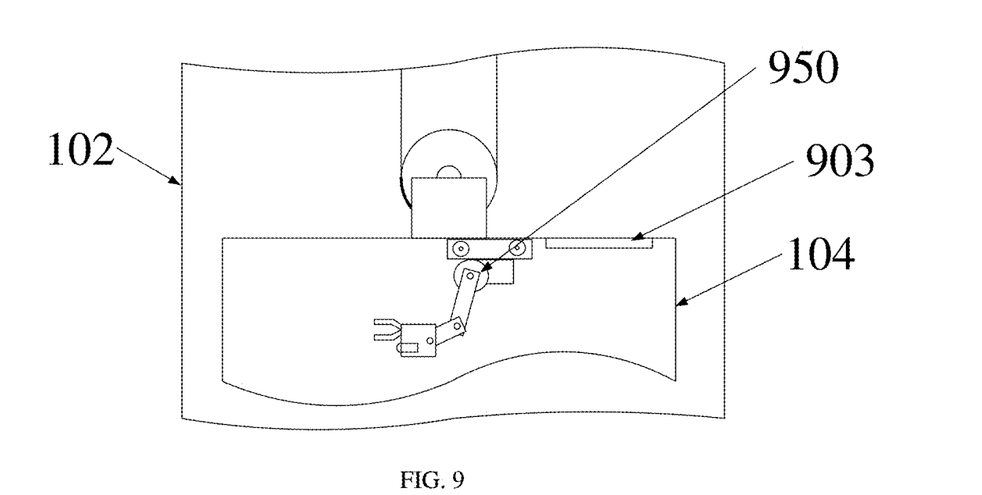

As shown in FIG. 9, in some other embodiments, a single track-less inspection and maintenance system 950 is used that can move between the external and internal surfaces of the elevator cab 104 through a door 903 attached to the roof or walls of the elevator cab 104. In these embodiments, the single track-less inspection and maintenance system 950 can inspect and monitor elements of the hoist way outside the elevator cab 104 and components within the inner chamber of the elevator cab 104.

Figure 10:
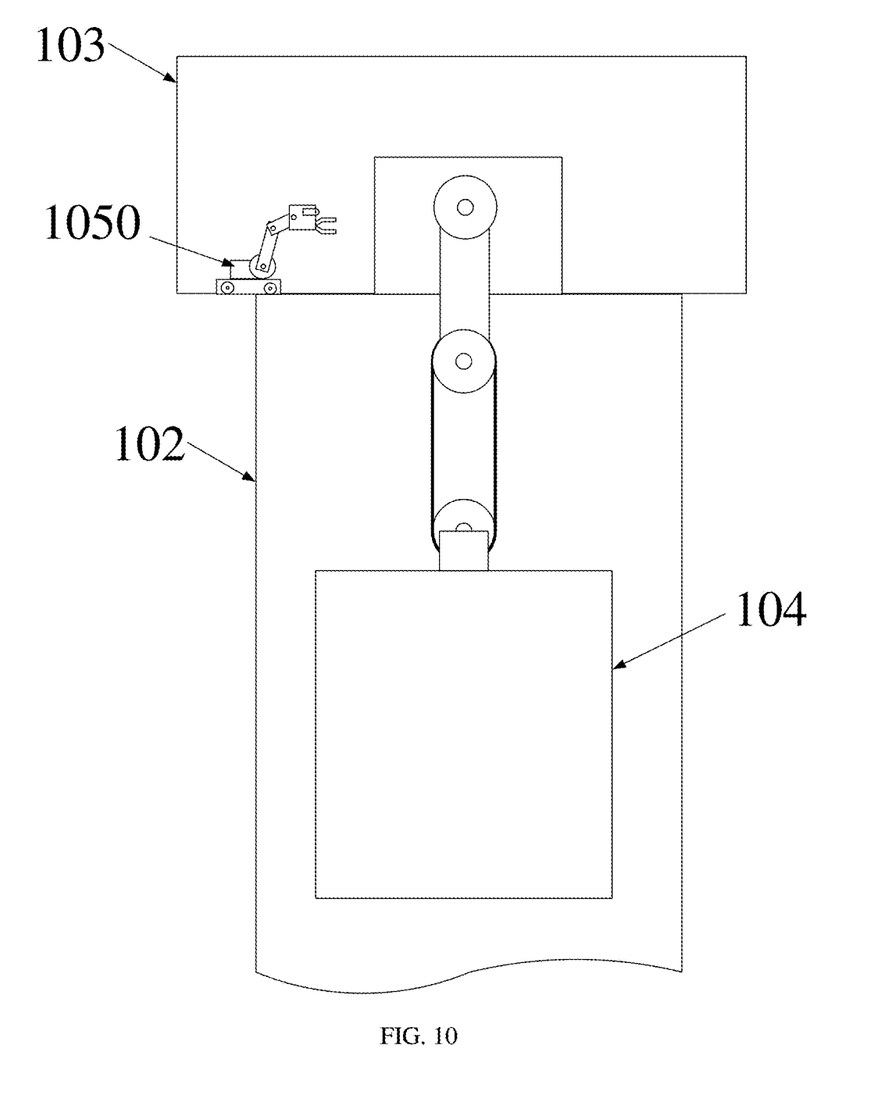

As shown, in FIG. 10, a track-less inspection and maintenance system 1050 may be used for inspection and monitoring of the components of the machine room 103 such as governor/motor in the hoist way 102 of the elevator system 100.

Figure 11:
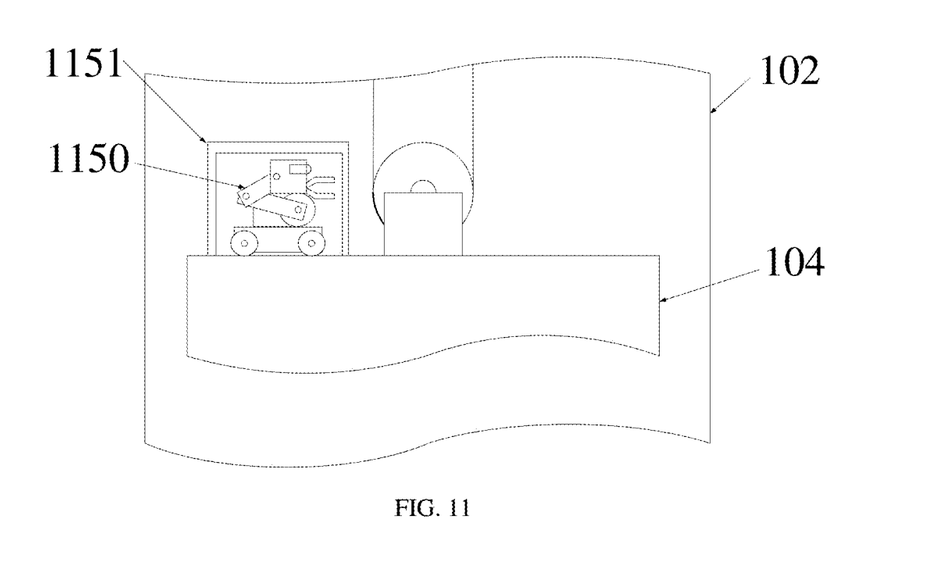

In some embodiments, as shown in FIG. 11, a track-less inspection and maintenance system 1150 is stored in a storage compartment 1151 when not in use. The storage compartment 1151 may be a metallic or polymer casing, which can accommodate the inspection and maintenance system 1150 in a collapsed form. In some embodiments, the storage compartment 1151 is placed on any of the internal or external roof, wall, or floor panel of the elevator cab 104. Other embodiments may include storage compartment located at various other locations, such as inside the elevator cab or on the outer walls or base of the elevator cab, etc. The storage compartment 1151 may also include a charging means for charging the inspection and maintenance system 1150.

Figure 12A:
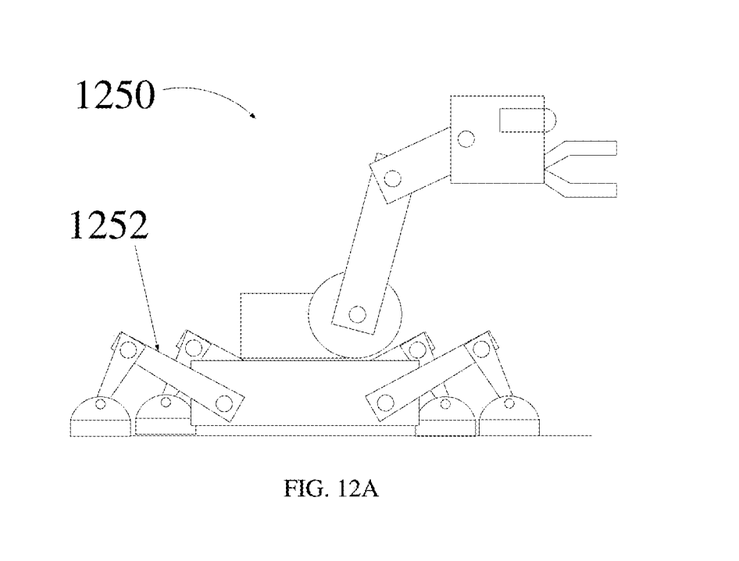
FIGS. 12A-12B schematically illustrate a twelfth embodiment of the elevator inspection and maintenance system.
Figure 12B:
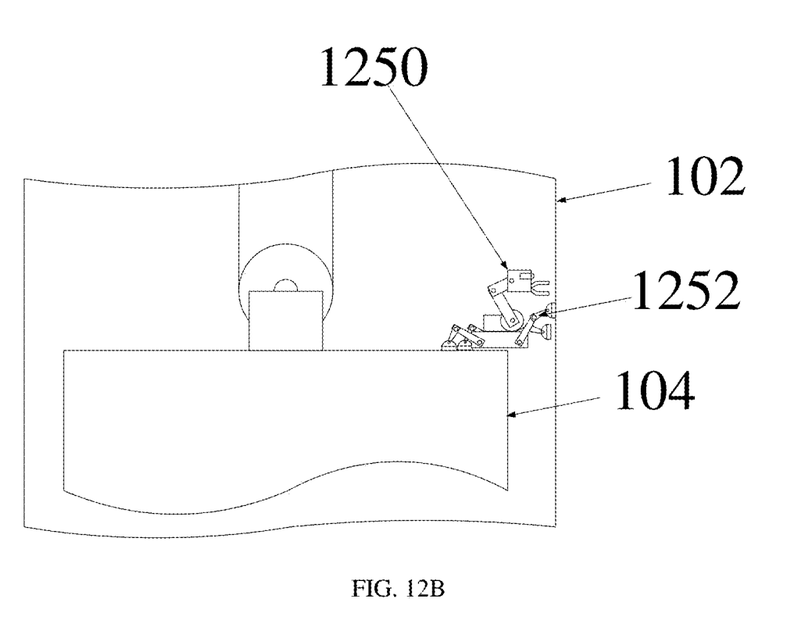

In some embodiments, as shown in FIGS. 12A-12B, the inspection and maintenance system 1250 includes a motion mechanism that has mechatronic legs 1252 instead of wheels. The mechatronic legs 1252 may include links and motors, similar to the mechatronic body 151 of previous embodiments for motion. The mechatronic legs 1252 may include electromagnetic or vacuum based adhesion systems, similar to embodiments shown in FIGS. 6-7, for selectively adhering the inspection and maintenance system 1250 to the various surfaces of the elevator cab 104, hoist way 102, or machine room of an elevator system 100. The mechatronic legs 1252 may allow the inspection and maintenance system 1250 to scale obstacles and to move from elevator cab 104 to the walls of the hoist way 102 when the elevator cab 104 is stationary. The mechatronic legs 1252 may be controlled by a controller placed in the body of the inspection and maintenance system 1250. The controller may be preprogrammed to move the mechatronic legs in a specific pattern or may be controlled remotely via a communication unit by a human operator from a remote control room.

The components of the various embodiments of the system 150, 250, 350, 452, 456, 550, 650, 750, 852, 854, 950, 1050, 1150, 1250 may be made by standard manufacturing procedures or assembled using off the shelf components. For example, the rigid components, such as base 152, intermediate component 154, links 156, inspection and maintenance head 160, manipulation tool 164, wheels 256, track 254, wheels 356, track 354, mechatronic legs 1252 may be made of strong and light weight metals, metal alloys, plastic or other lightweight and strong materials such as carbon fiber or fiber glass. The components can be made by any type of additive or subtractive manufacturing methods, for example, the components can be made by any subtractive processes such as milling, drilling, cutting, turning, etc.; or the components can be made by additive manufacturing or three dimensional printing methods such as Vat Polymerization, material jetting, binder jetting, material extrusion, powder bed fusion, sheet lamination, directed energy deposition, etc. The electrical and electronic components such as actuators in the base 150, intermediate component 152, joints 158, sensor hub 162, power source 166, controller 168, and communication unit 170, may be off-the-shelf components known in the art.

Various other modifications, adaptations, and alternative designs are of course possible in light of the above teachings. Therefore, it should be understood at this time that within the scope of the appended claims the invention might be practiced otherwise than as specifically described herein.

Advantages

The present invention presents an advantage of a system for remote elevator inspection and maintenance, thereby reducing the servicing time and cost of elevator inspection and maintenance operations.

Another advantage of the present invention is that it provides for a system for automatic elevator inspection and maintenance, thereby making a high frequency of elevator inspection and maintenance operations practically possible.

Yet another advantage of the invention is that it reduces the need for a human operator to enter an elevator hoist way to perform elevator inspection and maintenance, thereby reducing hazard to the human operator.

What is claimed is:

1. An elevator inspection and maintenance system, comprising:
   a mechatronic body movable via remote or automatic operation,
   an inspection and maintenance head installed on the mechatronic body,
   wherein said inspection and maintenance head is fitted with a sensor or a manipulation tool to perform an inspection or a maintenance operation on at least one component of an elevator system remotely or automatically;
   wherein the elevator inspection and maintenance system is installable on an elevator cab, in a hoist way, or in a machine room of the elevator system;
   wherein the elevator inspection and maintenance system includes a track laid on said elevator cab, hoist way, or machine room, and wherein the elevator inspection and maintenance system is movably attached to said track.

2. The elevator inspection and maintenance system as claimed in claim 1, wherein the elevator inspection and maintenance system is installed on a roof, a base, or a side wall outer panel or one of a roof, base, or side wall inner panel of said elevator cab.

3. The elevator inspection and maintenance system as claimed in claim 1, wherein the elevator inspection and maintenance system is movably attached to an elevator cab, or to any component in a hoist way, or machine room by a vacuum sub-system.

4. The elevator inspection and maintenance system as claimed in claim 1, wherein the elevator inspection and maintenance system is movably attached to an elevator cab, or to any component in a hoist way, or machine room using a permanent or electromagnet.

5. The elevator inspection and maintenance system as claimed in claim 1, wherein the elevator inspection and maintenance system is movably attached to one of outer or inner roof, base, or a side wall panel of said elevator cab.

6. The elevator inspection and maintenance system as claimed in claim 1, wherein said mechatronic body includes:
   a base;
   one or more connecting rods and rotatable joints operably connecting the base; and
   a number of actuators adapted to move the mechatronic body.

7. The elevator inspection and maintenance system as claimed in claim 1, wherein the inspection and maintenance head is fitted with a sensor hub comprising two or more sensors.

8. The elevator inspection and maintenance system as claimed in claim 1, wherein said manipulation tool is configured to measure vibrations in an elevator component.

9. The elevator inspection and maintenance system as claimed in claim 1, wherein said system can communicate measurements of the sensor to a remote server via the internet.

10. The elevator inspection and maintenance system as claimed in claim 1, wherein the remote movement, inspection, and monitoring procedures of the elevator inspection and maintenance system is performed by a human operator in a remote control room in communication with the elevator inspection and maintenance system.

11. A method for remotely monitoring equipment in an elevator cab hoist way using the inspection and maintenance system as claimed in claim 1, said method comprising:
   remotely operating the inspection and maintenance system by an operator from a control room; and
   running inspection tests on equipment accessible to the inspection and maintenance system through said remote operation.

12. An elevator inspection and maintenance system, comprising:
   a mechatronic body movable via remote or automatic operation,
   an inspection and maintenance head installed on the mechatronic body,
   wherein said inspection and maintenance head is fitted with a sensor or a manipulation tool to perform an inspection or a maintenance operation on at least one component of an elevator system remotely or automatically;
   wherein said mechatronic body includes:
   a base;
   one or more connecting rods and rotatable joints operably connecting the base; and
   a number of actuators adapted to move the mechatronic body;
   wherein said base includes a number of wheels for moving the remote elevator inspection and maintenance system.

13. An elevator inspection and maintenance system, comprising:
   a mechatronic body movable via remote or automatic operation,
   an inspection and maintenance head installed on the mechatronic body,
   wherein said inspection and maintenance head is fitted with a sensor or a manipulation tool to perform an inspection or a maintenance operation on at least one component of an elevator system remotely or automatically;
   wherein said mechatronic body includes:
   a base;
   one or more connecting rods and rotatable joints operably connecting the base; and
   a number of actuators adapted to move the mechatronic body;
   wherein said base includes a number of mechatronic legs for moving the remote elevator inspection and maintenance system.

14. An elevator cab comprising:
   an elevator cab body;
   an elevator inspection and maintenance system attached to said elevator cab body; wherein the elevator inspection and maintenance system includes:
   a mechatronic body movable via remote or automatic operation,
   an inspection and maintenance head installed on the mechatronic body,
   wherein said inspection and maintenance head is fitted with a sensor or a manipulation tool to perform an inspection or a maintenance operation on at least one component of an elevator system remotely or automatically;

wherein the elevator inspection and maintenance system is movably attached to the elevator cab body via a track laid on said inner or outer roof, base, or side wall panel of the elevator cab.

15. The elevator cab as claimed in claim 14, wherein the elevator inspection and maintenance system is movably attached to an inner or outer roof, base, or side wall panel of the elevator cab.

16. The elevator cab as claimed in claim 14, wherein the elevator inspection and maintenance system is movably attached to said elevator cab body via a vacuum sub-system.

17. The elevator cab as claimed in claim 14, wherein the elevator inspection and maintenance system is movably attached to said elevator cab body using a permanent or electromagnet.

18. The elevator cab as claimed in claim 14, wherein said mechatronic body includes:
   a base;
   one or more connecting rods and rotatable joints operably connecting the base to the inspection and maintenance head; and
   a number of actuators adapted to move the said connecting rods and rotatable joints.

19. The elevator cab as claimed in claim 14, wherein said manipulation tool is configured to measure vibrations in an elevator component.

20. The elevator cab as claimed in claim 14, wherein said inspection and maintenance system can operate automatically on a pre-planned inspection routine.

21. The elevator cab as claimed in claim 14, wherein said inspection and maintenance system can communicate measurements of the sensors to a remote server via the internet.

22. The elevator cab as claimed in claim 14, wherein the remote movement, inspection, and monitoring procedures of the elevator inspection and maintenance system is performed by a human operator in a remote control room in communication with the elevator inspection and maintenance system.

23. An elevator cab comprising:
   an elevator cab body;
   an elevator inspection and maintenance system attached to said elevator cab body; wherein the elevator inspection and maintenance system includes:
      a mechatronic body movable via remote or automatic operation,
      an inspection and maintenance head installed on the mechatronic body,
      wherein said inspection and maintenance head is fitted with a sensor or a manipulation tool to perform an inspection or a maintenance operation on at least one component of an elevator system remotely or automatically;
   wherein said mechatronic body includes:
   a base;
   one or more connecting rods and rotatable joints operably connecting the base to the inspection and maintenance head; and
   a number of actuators adapted to move the said connecting rods and rotatable joints;
   wherein said base includes a number of wheels for moving the inspection and maintenance system over the surface of elevator cab body.

24. An elevator cab comprising:
   an elevator cab body;
   an elevator inspection and maintenance system attached to said elevator cab body; wherein the elevator inspection and maintenance system includes:
      a mechatronic body movable via remote or automatic operation,
      an inspection and maintenance head installed on the mechatronic body,
      wherein said inspection and maintenance head is fitted with a sensor or a manipulation tool to perform an inspection or a maintenance operation on at least one component of an elevator system remotely or automatically;
   wherein said mechatronic body includes:
   a base;
   one or more connecting rods and rotatable joints operably connecting the base to the inspection and maintenance head; and
   a number of actuators adapted to move the said connecting rods and rotatable joints;
   wherein said base includes a number of mechatronic legs for moving the inspection and maintenance system over the surface of said panel of the elevator cab.

* * * * *